Jan. 17, 1939. T. D. LAYMAN 2,144,294
INDEX DIRECTIONAL SIGNAL
Filed March 24, 1938

Inventor
T. D. Layman
Raymond Jones
Attorney

Patented Jan. 17, 1939

2,144,294

UNITED STATES PATENT OFFICE 2,144,294

INDEX DIRECTIONAL SIGNAL

Theodore D. Layman, Indianapolis, Ind.

Application March 24, 1938, Serial No. 197,906

7 Claims. (Cl. 116—52)

My invention relates to a novel index directional signal and has particular reference to those devices adapted for use in connection with motor vehicles as warning signals of a change in the mode of operation of the motor vehicle.

Heretofore, devices of this type have been objectionable either by virtue of the complexity of their structure and operation or their unsightly appearance.

The main object of my invention is to provide a vehicle operation warning signal that is simple in construction and operation.

Another object of my invention is to provide a device of the class described which, when in an operative position, will function in response to the control thereof by a vehicle driver to indicate a change in the mode of operation of the vehicle.

Another object is to provide a vehicle signal which, when not in operation, may be concealed from view.

A further object is to provide a vehicle signal of the nature described that is economical to manufacture and simple to install.

For a full disclosure of the invention, reference is made to the accompanying drawing, wherein—

Figure 1:
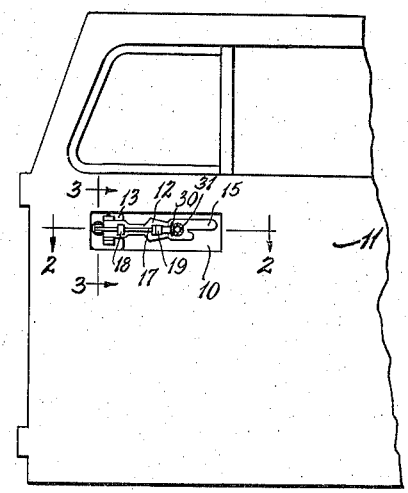
Figure 1 is a side view of an automobile door equipped with my improved index directional signal.
Figure 2:
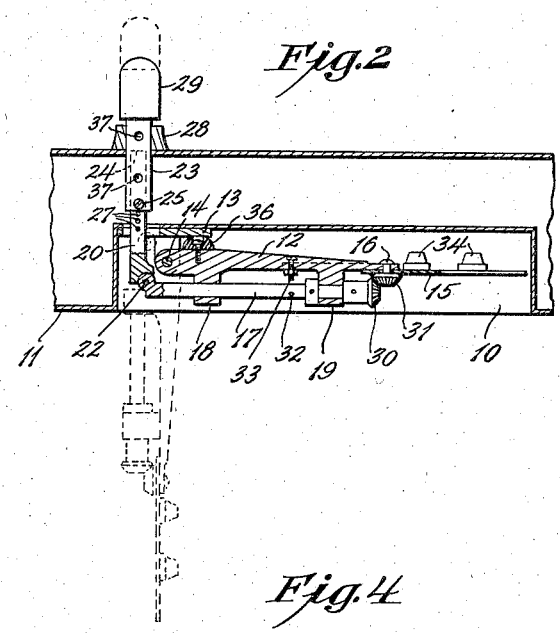
Fig. 2 is a plan view of the signal cross-sectioned along line 2—2 of Figure 1 showing the signal in its operative and inoperative positions.
Figure 3:
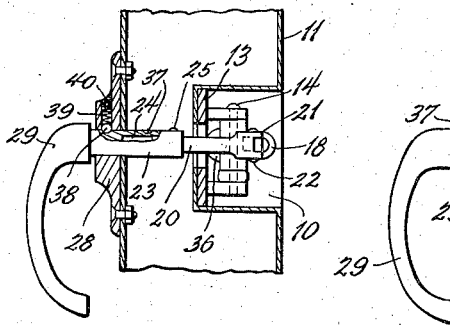
Fig. 3 is an end view of the signal cross-sectioned along line 3—3 of Figure 1 with parts removed.
Figure 4:
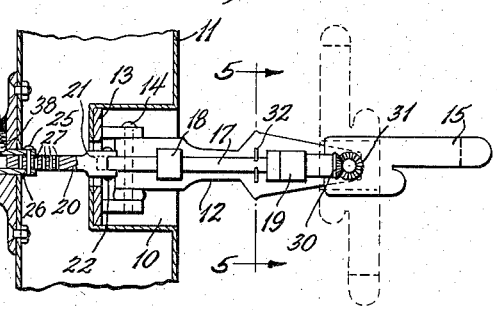
Fig. 4 is an end view of the signal in its operative position as viewed from the front with a showing of parts removed.
Figure 5:
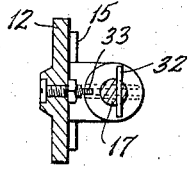
Fig. 5 is a fragmentary section of the signal taken along line 5—5 of Figure 4 showing the stop mechanism.
Figure 6:
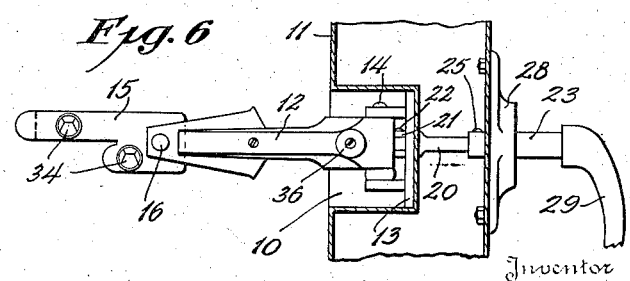
Fig. 6 is an end view of the signal in its operative position as viewed from the rear.

Referring to the drawing in detail, the invention is shown in its preferred form attached to an automobile door in a recessed compartment 10 formed in the side 11 thereof at a point adjacent the position of the driver of the vehicle and preferably about two inches below the ventilator window and two inches from the edge of the door.

A signal arm 12 is secured to the vehicle by means of a bracket 13 which has a vertically extending pin 14. The bracket 13 is mounted in the recess 10 in such a manner as to permit the arm 12 to pivot horizontally about the pin 14.

The arm 12 is further provided at its outer extremity with an index finger 15. The index finger 15 is rotatably attached to the arm 12 by means of a pin 16 and pivots vertically with respect to the arm.

The operating and control mechanism for the signal comprises a shaft 17 mounted on the arm 12, and parallel thereto by means of bearings 18 and 19 which are secured to the arm. The shaft 17 is secured at the end thereof adjacent the bracket 13, to a bar 20 which extends through the side of the vehicle. The means for connecting the shaft 17 and the bar 20 comprises a clevis 21 attached to the bar 20. A vertical pin 22 extends through the clevis 21 and the shaft 17 permitting the shaft to pivot in a horizontal plane. The bar 20 passes through openings provided in the anchor plate of the bracket 13 and the side of the vehicle. The end of the bar 20 within wall structure of the vehicle is adjustably and removably secured to a shaft 23 within a recess 24 formed in the shaft and longitudinally thereof. The coacting end of the shaft 23 and the recess 24 are preferably rectangular in cross-section. A pin 25 extends transversely through diametric openings 26 and 27 provided in shaft 23 and bar 20, respectively, to connect these members. Bar 20 is provided with a plurality of openings 27 to render the connection between shaft 23 and bar 20 adjustable to compensate for variations of width of the side wall or door structure of different vehicles. The shaft 23 extends through openings provided in the inside wall of the vehicle and through a fitting 28 to the interior of the vehicle. A control lever 29 is secured to the end of the shaft 23 adjacent the fitting 28.

The end of the shaft 17 adjacent the index finger 15 is provided with a beveled pinion 30. A beveled pinion 31 is secured to the index finger 15 and the pin 16 which is rotatably attached to the arm 12. Beveled pinions 30 and 31 mesh and transmit the rotational movement of the shaft 17 to vertically rotate the index finger 15. The shaft 17 is further provided with a pin 32 which extends transversely therethrough. The pin 32 is positioned slightly off-center with respect to the shaft 17 and thereby cooperates with a stop 33 mounted on the arm 12 to limit the rotational movement of the shaft 17 to approximately 180 degrees.

The index finger 15 is provided at its outer end with jewel reflectors 34 visible to traffic to the rear of the vehicle. When the vehicle signal is operated at night, the rays from the lights of the traffic to the rear of the vehicle are reflected to indicate the position of the index finger 15.

Vibration of the vehicle signal may be reduced by means of a rubber cushion or stop 36 secured to the arm 12 at a point adjacent the bracket 13 and on the face of the arm which approaches the wall of the vehicle when the signal is moved to its inoperative position.

To lock the index signal in inner and outer horizontal positions, the fitting 28 is bored to receive a ball 38 which is pressed against shaft 23 by means of a spring 39 retained by a set-screw 40. The shaft 23 is provided with two detent recesses 37 which are located to register with the ball 38 when the index signal is in its inner inoperative position or when it extends outwardly to indicate a left turn of the vehicle.

In operating the vehicle signal herein described, the driver of the vehicle manually draws the shaft 23 and bar 20 inwardly by pulling inwardly on the control lever 29. As a result of this movement, the shaft 17 pivots horizontally on the vertical clevis pin 22 and simultaneously causes the arm 12 and index finger 15 mounted thereon to pivot horizontally about the vertically positioned bracket pin 14. The arm 12 and shaft 17 pivot horizontally until the arm is perpendicular to the side of the vehicle and in full view of any vehicle operator approaching from the front or rear. When the arm 12 reaches its fully extended position, the shaft 17 is in alignment with the bar 20 and the shaft 23, and the index finger 15 extends horizontally to give the recognized signal indicating a left turn. The vehicle operator may turn the control lever in a forward direction thereby rotating the shaft 23, bar 20 and shaft 17 in a counter-lockwise direction until the pin 32 meets stop 33 on the arm 12 to prevent further rotation of the operating mechanism. Counter-clockwise rotation of the shaft 17 causes a similar rotation of the index finger 15 until it is directed upwardly from the horizontal at an angle of approximately forty-five degrees. In this position, the index finger 15 registers the recognized signal indicating a right turn. Correspondingly, movement of the control lever 29 in a rearward direction causes a clockwise rotation of the shaft 17 and the index finger 15 by means of the beveled pinions 30 and 31 until the pin 32 again meets stop 33. The index finger 15 will then extend downwardly from the horizontal at approximately a forty-five degree angle to register the commonly recognized signal indicating that the vehicle is about to stop. It will be noted that in every position of the index finger 15, other than that of horizontal, the clevis pin 22 due to the rotation of the shaft 17 and bar 20 is at some position other than vertical. In such angular positions of pin 22 the shaft 17 cannot swing fore or aft due to the fixed vertical position of the bracket pin 14 upon which arm 12 pivots and the angular position of pin 22. As a result of this condition, the vehicle signal is substantially locked against any horizontal movement unless the same is positioned straight out to register a left turn.

While I have disclosed a preferred form of the invention, it is to be understood that various modifications and equivalents are contemplated such as may be embraced within the scope of the appended claims.

I claim:

1. In an index directional signal, the combination of a swinging signal arm, a bracket for supporting said arm, a vertically swinging index finger pivotally mounted on the free end of said arm, a gear attached to said index finger at its pivotal point, a shaft rotatably mounted on and substantially parallel to said arm, a gear attached to the end of said shaft and in mesh with said first-named gear, and control means operably associated with said shaft to swing said arm, rotate the shaft and swing said index finger to positions above or below said arm.

2. In an index direction signal as set forth in claim 1 in which the control means comprises a combined reciprocable and rotatable bar connected to the rotatable shaft by means of a pivot joint, said joint being located closely adjacent the bracket that supports the signal arm, movement inwardly of said bar being operable to swing the signal arm on its bracket, the rotary movement of the bar being operable to displace the index finger to positions at an angle above and below the signal arm.

3. In an index directional signal, the combination of a horizontally pivoting arm, a vertically pivoting index finger mounted on said arm, a gear attached to said index finger at its pivotal point, a shaft rotatably mounted on and parallel to said arm, a gear attached to the end of said shaft and meshed with said index finger gear, a bar, a vertical clevis attached to said bar and connected in hinged relation to said shaft, said bar being reciprocable to horizontally pivot said shaft and arm associated therewith and being rotatable to rotate said shaft to swing said index finger in a vertical plane.

4. In combination with support, a signal arm, said support being provided with a recess for housing said arm, a bracket secured within said recess, a pivot for connecting said arm to the bracket, an index finger pivotally supported on the outer end of the signal arm, a control rod rotatably mounted on the signal arm and connected to the index finger, an operating rod slidably mounted at one side of said pivot, a pin for connecting one end of the operating rod to an end of the control rod, said pivot and pin being positioned within said recess and on the same side of the bracket, said operating rod being slidable in one direction to move said signal arm out of the recess at a right angle to the support, said rods thereafter being rotatable to swing the index finger, said pin in positions non-parallel to the pivot functioning to prevent movement of the signal arm around its pivot.

5. In an index directional signal, a main arm, means comprising a fixed pivot for supporting said arm to swing in a plane, an index finger pivotally supported on said arm to swing in a plane at a right angle to said other plane to positions above and below the plane of the arm, a control rod for said finger rotatably mounted on and parallel to the main arm, means operably connecting the index finger and the control arm, an operating rod, means for inter-connecting said rods comprising a U-shaped forked end on one of said rods, a pin for connecting said forked end to the associated rod, said operating rod being slidable to move the main arm and being rotatable to rotate the index finger on the main arm.

6. In combination with a support, a bracket secured to said support, a signal arm, said bracket and arm being pivotally interconnected, an index directional finger pivotally secured to the free end of said arm, a control rod rotatably supported on said arm and substantially parallel thereto, means operably connecting one end of the rod to said finger to rotate the finger on the arm, the other end of said rod being extended inwardly to a position at one side of said bracket, an operating rod extending through said support and being connected by a pin to said control rod, said operating rod being slidable inwardly through the support to swing said arm and control rod as a unit to a position at a right angle to the support, said rods thereafter being rotatable as a unit to cause said finger to swing to a desired position above or below said signal arm.

7. In a combination as set forth in claim 6, stop means for limiting extreme rotation of said rods in two directions, said pivot and pin when in parallel relation permitting movement of the operating rod outwardly when the signal arm is moved to a position parallel to the support, the rotation of said pin by said operating rod to a horizontal position serving to lock said signal arm in its extended position.

THEODORE D. LAYMAN.